Sept. 6, 1932.  L. W. WINTER  1,876,158
LANDING AND BEACHING GEAR FOR AIRCRAFT
Filed Dec. 15, 1931   5 Sheets-Sheet 1
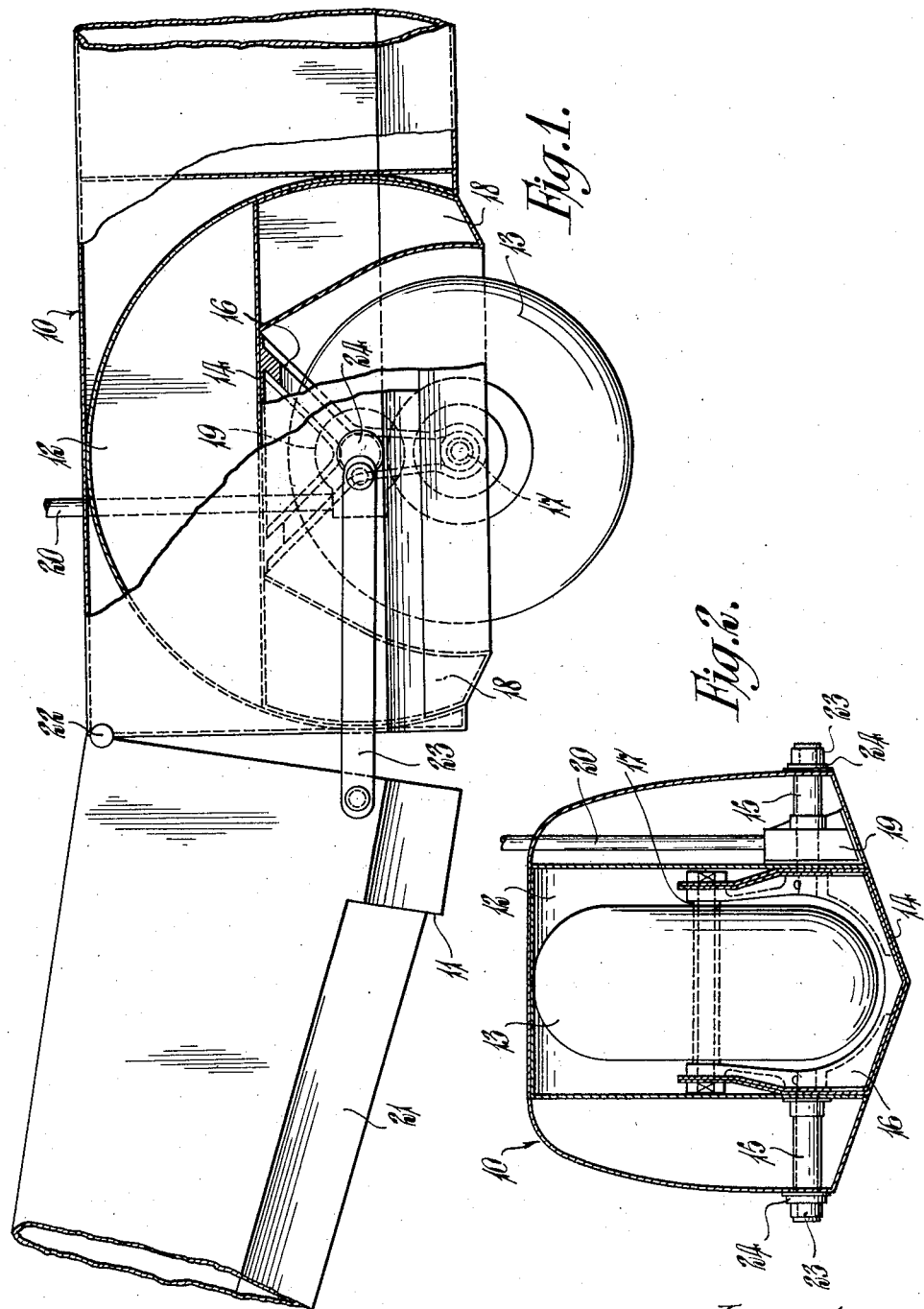
Inventor:
Leonard Willoughby Winter
By
Attorney.

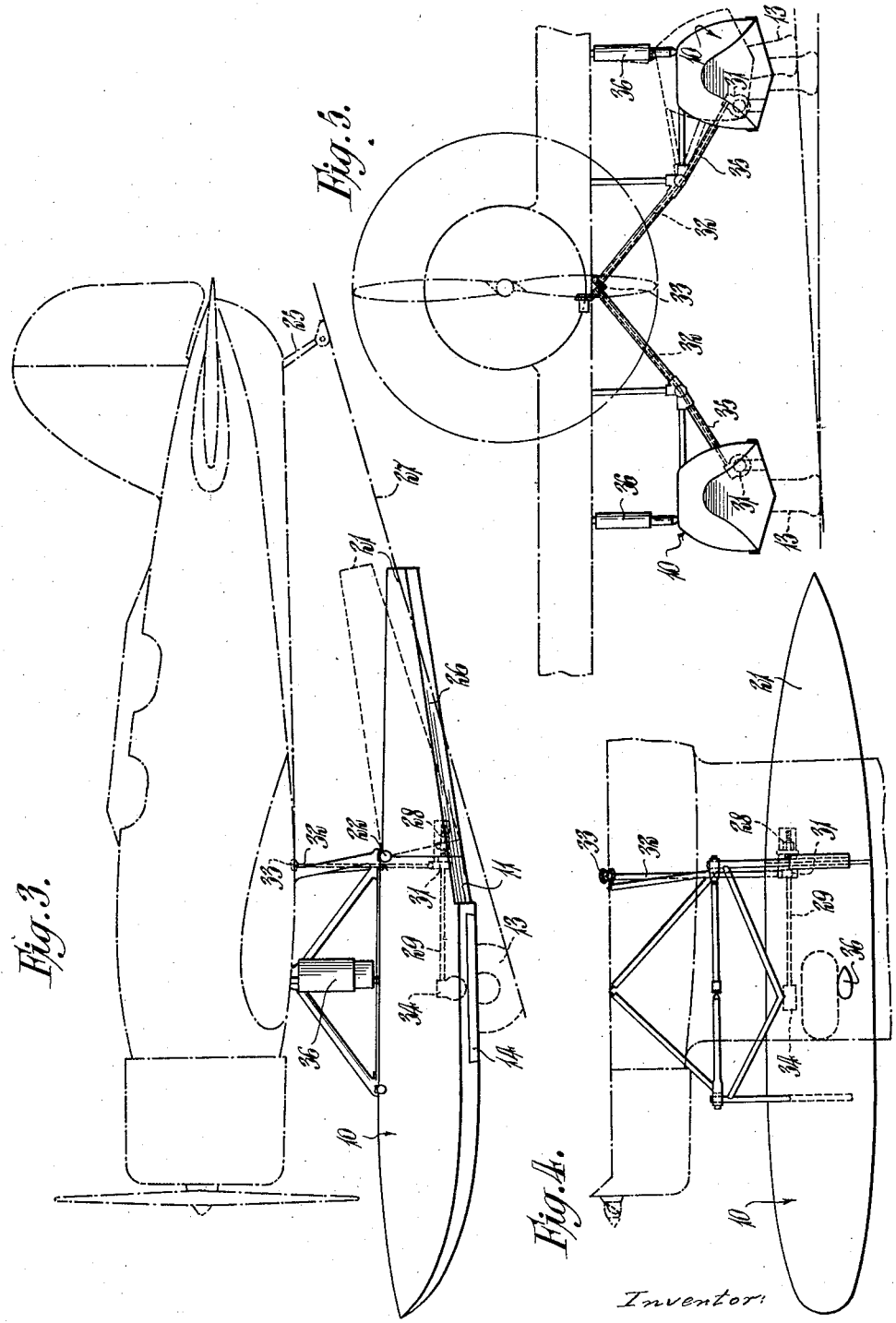

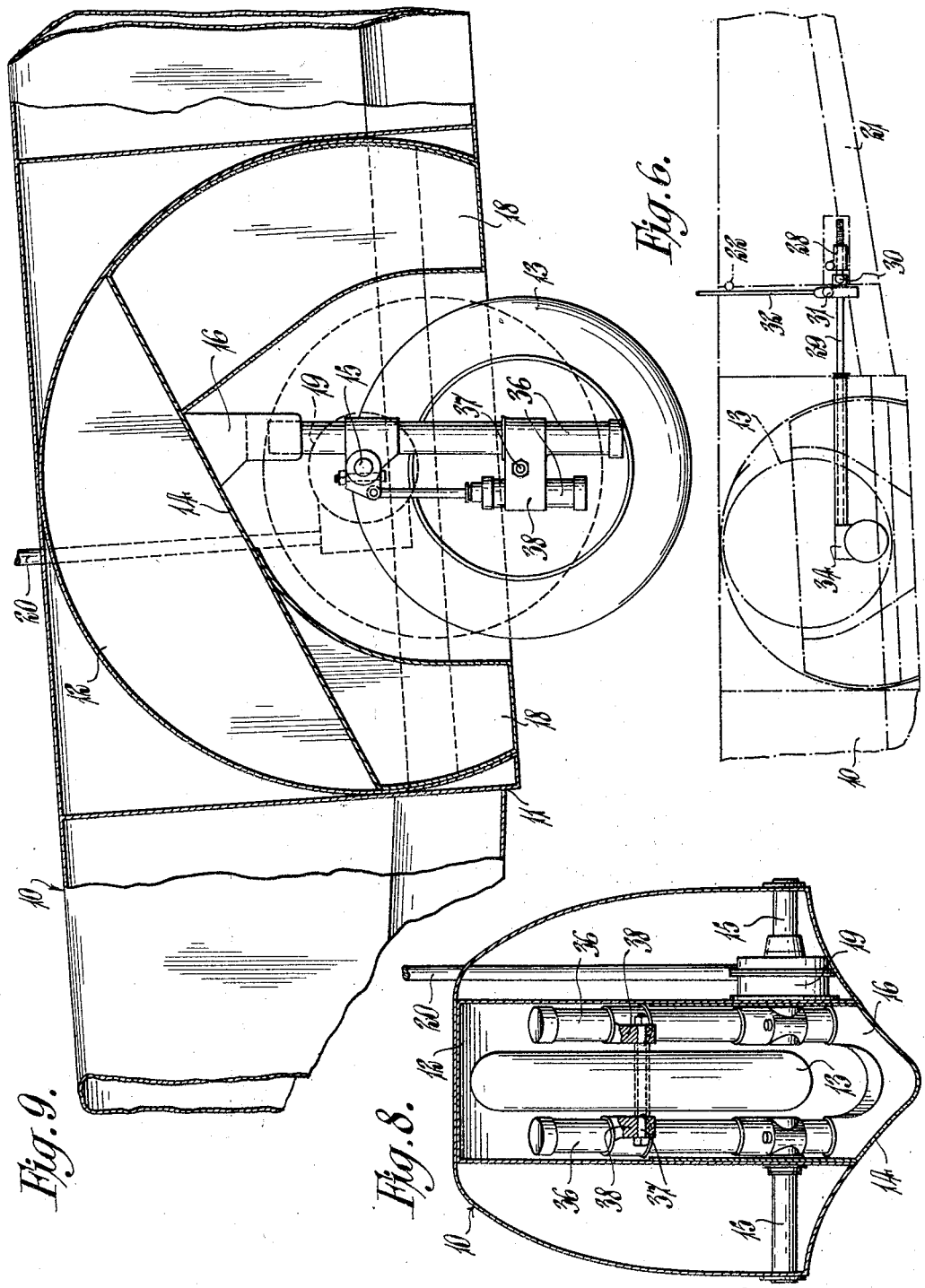

Sept. 6, 1932.   L. W. WINTER   1,876,158
LANDING AND BEACHING GEAR FOR AIRCRAFT
Filed Dec. 15, 1931   5 Sheets-Sheet 4
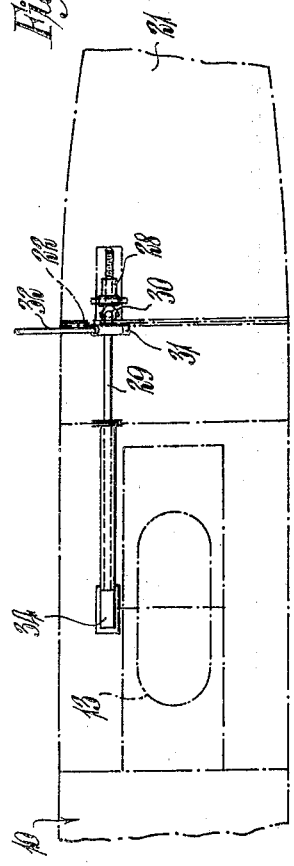
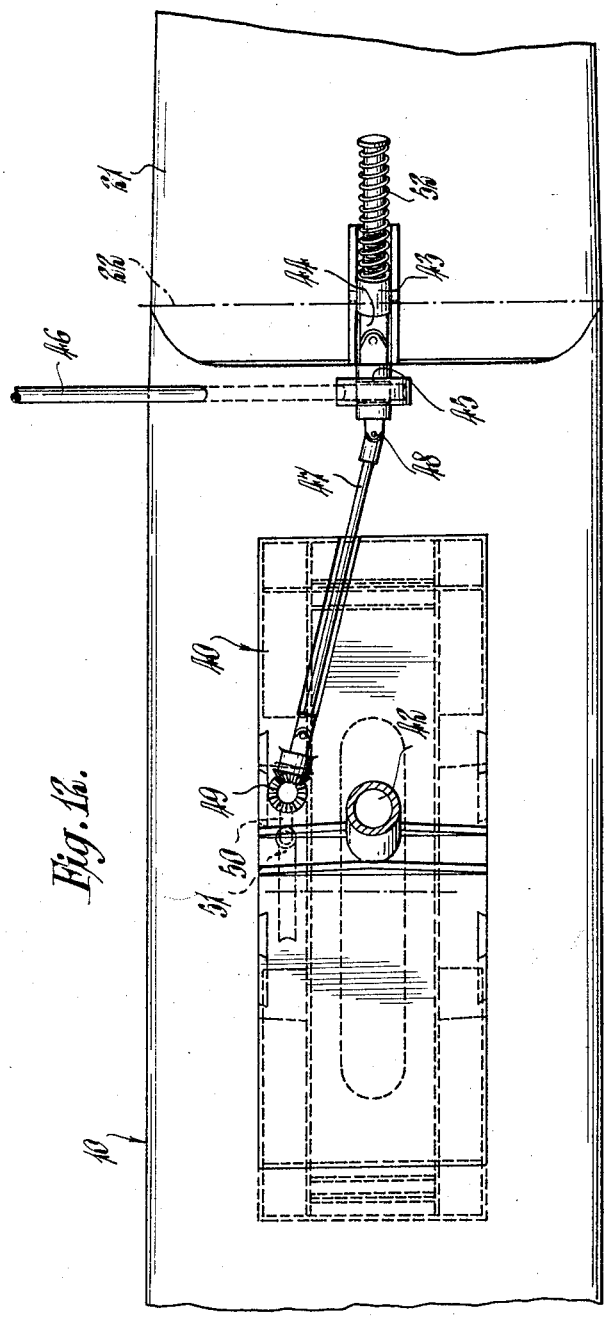
Inventor:
Leonard Willoughby Winter
By
Attorney,

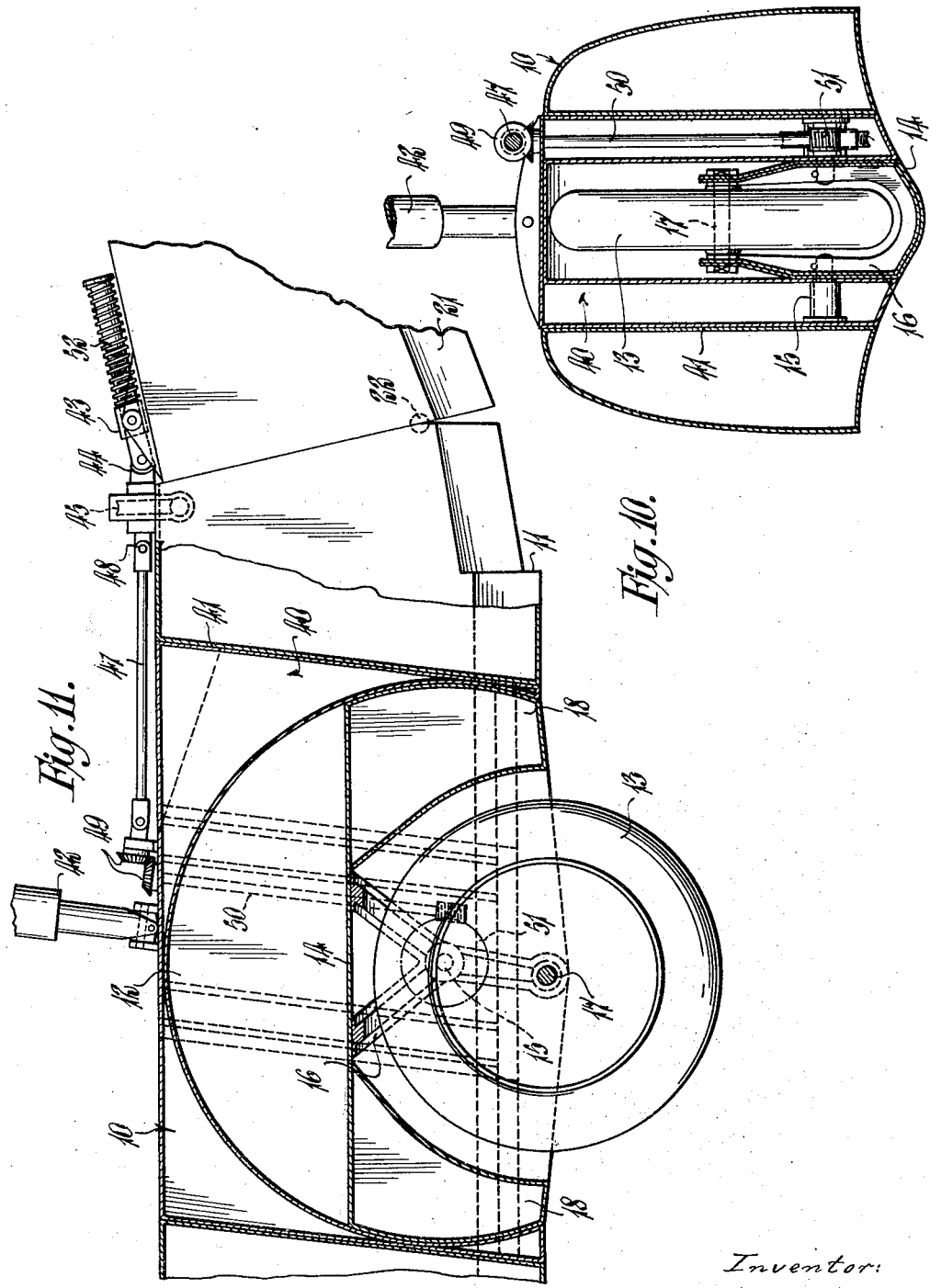

Patented Sept. 6, 1932

1,876,158

UNITED STATES PATENT OFFICE

LEONARD WILLOUGHBY WINTER, OF BLUEBELL HILL, NEAR ROCHESTER, ENGLAND

LANDING AND BEACHING GEAR FOR AIRCRAFT

Application filed December 15, 1931, Serial No. 581,203, and in Great Britain December 8, 1930.

This invention relates to alighting gears for aircraft and means for transporting aircraft after they have alighted on water, snow, ice or ships, and has for its object to provide an improved means whereby the landing gear and wheel or wheels are housed in a buoyant body. The buoyant body will hereinafter be referred to as the float, hull or hulls of the aircraft as the case may be.
More particularly the invention has for its object to construct means whereby the planing bottom surface of the floats, hull or hulls is maintained in true form after the wheel has been retracted into the buoyant body.
Accordingly this invention comprises the provision of means whereby not only may a wheel inserted in a float or hull be retracted in order to facilitate an aircraft leaving the water, but also the slot through which the wheel or wheels rise and fall may be closed in order to maintain the planing bottom surfaces.

In order that the invention may be more readily understood, reference will now be made to the accompanying drawings, wherein:—

Fig. 1 is a part-sectional side elevation of a float and wheel forming one embodiment of the invention;
Fig. 2 is a vertical section thereof, but with the wheel in the closed or retracted position.

Figs. 3, 4 and 5 are respectively a side elevation, plan and end view of a float arrangement in accordance with the invention as applied to a seaplane, the latter being shown in dotted lines.

Figs. 6 and 7 are enlarged detail views;

Fig. 8 is a section of another embodiment, and Fig. 9 is a side view thereof.

Fig. 10 is a section of another embodiment;

Fig. 11 is a corresponding side view, and

Fig. 12 is a plan.
Referring firstly to Figs. 1 and 2, a float 10 provided with a step 11 has immediately forward of the step a semicircular or D-shaped slot or opening 12 in which is housed a wheel 13 and a closing plate 14, these parts 13, 14 being joined for simultaneous movement. For this purpose shafts 15 journalled in the float carry a three-armed bridge piece 16, one arm of which carries at 17 the hub of the wheel (which is of the so-called airwheel form) while the other two are attached to the plate 14. The latter carries two watertight compartments 18 and may be shaped so as to form a mudguard for the wheel when the latter is in the position shown in Fig. 1.

One of the shafts 15 carries a worm wheel or other gear at 19, this gear being driven from a shaft 20 extending to the pilot's seat. Thus when the shaft is rotated, the wheel may be swung from the position of Fig. 1 to that of Fig. 2 or vice versa, the plate 14 being simultaneously moved so as to cover the opening in the float when the wheel is out of use (Fig. 2) or to move into the float when the wheel is projected therefrom (Fig. 1).

The tail 21 of the float is pivoted at 22 and is connected by a link 23 to a crank, eccentric or the like 24 on each shaft 15. The purpose of this will be clear from Fig. 3 which, however, illustrates different mechanism. It will be seen that, with a long float in use, a tail-skid such as 25 will not be adapted for use with a wheel in the float due to the tail of the float striking the ground at 26 unless, in accordance with the arrangement mentioned, the tail of the float can be swung up simultaneously with the outward movement of the float wheels. When such swinging occurs the tail-skid may be used as indicated on the line 27.

In Figs. 3–7, the tail of each float carries a nut 28 engaging the threaded end of a shaft 29, such threaded end being universally jointed to its shaft at 30. Carried on each shaft 29 is a worm wheel 31 operated by a worm (not shown) on a shaft 32. The two shafts 32 are coupled by bevel wheels 33 which are in turn operated by gearing under the control of the pilot. With the shafts 29 prevented from axial movement, it will be seen that rotation thereof will cause the tails of the floats to swing upwardly into the dotted line position of Fig. 3. The shafts 29 may carry at 34 worms operating the shafts 15, in which event the shafts 20 may be omitted.

The shafts 32 are provided with intermediate universal joints and are preferably housed in tubes 35 forming part of the framework supporting the floats, which latter are pivotally mounted on joints in such tubes and connected to the machine by shock-absorbers 36. The wheels may or may not be provided with additional shock-absorbers.

Figs. 8 and 9 show an arrangement in which a wheel is provided with shock-absorbing mechanism adapted to be housed in the float. In these figures reference numerals 10–16 and 18–20 refer to parts corresponding to the similar parts described with relation to Figs. 1 and 2, the only differences as regards these parts being the form of the wheel, which is not of the "air-wheel" 'type, and that of the bridge piece. In this instance the bridge-piece carries the shock-absorbers 36 and the wheel is supported from an axle 37 carried by the shock-absorbers at 38.

Turning now to Figs. 10–12, in which the parts corresponding to those in Figs. 1 and 2 are provided with similar references, it will be seen that the D-shaped opening 12 is now formed in a box-like frame 40 carrying spindles 15 and slidable at 41 in the float against the action of a shock-absorber 42, anchored to the aircraft, e. g. to a wing. The wheel 13 is of ordinary form and the hinge 22 is situated at the bottom of the float. The top of the tail 21 is coupled by a nut 43 to a universally jointed shaft 44 operated by worm mechanism 45 and a shaft 46 from the pilots seat. This shaft 46 may also be coupled to similar mechanism on another float. The worm mechanism also drives a shaft 47 having a universal sliding joint 48, this shaft being coupled by bevels 49 to a shaft 50. Shaft 50 drives worm gearing 51 by which the spindles 15 are rotated. A spring 52 is fitted as shown on the shaft 44.

While I have described embodiments of my invention as applied to floats it will be clear that it is equally applicable to other buoyant bodies such as a flying-boat hull. Other modifications of the arrangements described may be made.

The closing plate may be provided with a vent or drain hole or valve, and the wheels may be fitted with brake gear.

What I claim is:—

1. Aircraft alighting gear comprising a buoyant body having an opening, a ground wheel, means for swinging said wheel about a pivot positioned within said body into the buoyant body from its operative position by way of said opening and vice versa, a cover for said opening pivoted about the same axis as the wheel, and means for moving said cover into position when the wheel is withdrawn into the buoyant body, and for moving the cover into the body when the wheel is in operative position.

2. Aircraft alighting gear comprising a buoyant body having an opening, a ground wheel, means for moving said wheel about a pivot positioned within said body into the buoyant body from its operative position by way of said opening and vice versa, and a plate coupled to the wheel-operating means to swing about the wheel pivot into a position covering said opening when the wheel is retracted and to swing into the body when the wheel is in operative position.

3. Aircraft alighting gear comprising a buoyant body having an opening, a ground wheel, means for moving said wheel about a pivot positioned within said body into the buoyant body from its operative position by way of said opening and vice versa, said means including a drive shaft, and a cover for said opening operable from said shaft to swing about the pivotal axis for the wheel and close the opening when the wheel is retracted.

4. Aircraft alighting gear comprising a buoyant body having an opening, a wheel, means for moving said wheel about a pivot positioned within said body into the buoyant body from its operative position by way of said opening and vice versa, said means comprising a crank arm and a drive shaft therefor, a second crank arm carried on said shaft, and a cover for said opening carried by said second arm to close the opening when the wheel is retracted.

5. Aircraft alighting gear comprising a buoyant body having an opening, a wheel, means for moving said wheel into the buoyant body from its operative position by way of said opening and vice versa, said means including a pair of stub shafts journalled in said float and a bridge-piece carrying said wheel and connecting said shafts, and a closing member for said opening carried by said bridge-piece.

6. Aircraft alighting gear comprising a float formed of a main body portion having an opening and a tail portion pivotally connected to said body portion, a pivoted wheel, means for moving said wheel to and from its operative position from within and into said float, a cover for said opening swinging about the pivotal axis of the whel and operable upon withdrawal of said wheel, and means for moving said tail about its pivot upon actuation of said wheel.

7. Gear according to claim 6 including a shaft in the wheel actuating means and a link connecting said shaft to the tail.

8. Aircraft alighting gear comprising a buoyant body having an opening, a wheel, a pivot therefor positioned within the buoyant body, means for moving said wheel into the buoyant body from its operative position by way of said opening and vice versa, a shock-absorber associated with said wheel and its actuating means, and a cover for said opening swung on said pivot and operable by the drive-source of said wheel-actuating means to close said opening when the wheel is retracted and to move into the body when the wheel is in operative position.

9. Aircraft alighting gear comprising a buoyant body having an opening, an open-ended box-like frame slidable endwise within said opening, a wheel, journals in said frame for said wheel, a cover for the end of said frame, and means for simultaneously moving said wheel and cover.

10. Aircraft gear according to claim 9, having a shock-absorber anchored at one end and connected to the frame at the other.

11. Aircraft alighting gear comprising a buoyant body having an opening, a pivoted wheel, means for swinging said wheel into the buoyant body from its operative position by way of said opening and vice versa, a cover for said opening, said cover and wheel being so relatively mounted that the cover is housed within the buoyant body when the wheel is in its operative position, and means for moving said cover into position when the wheel is withdrawn into the buoyant body.

12. Aircraft alighting gear comprising a buoyant body having an opening, a pivoted wheel, means for swinging said wheel into the buoyant body from its operative position by way of said opening and vice versa, a cover for said opening, and means for moving said cover into position when the wheel is withdrawn into the buoyant body and for moving the cover into the buoyant body when the wheel is in operative position.

In testimony whereof I affix my signature.

LEONARD W. WINTER.